(12) United States Patent
Anderson et al.

(10) Patent No.: US 10,516,617 B2
(45) Date of Patent: *Dec. 24, 2019

(54) NETWORK THROUGHPUT

(71) Applicant: APS Technology 1 LLC, Sandy, UT (US)

(72) Inventors: Chris Anderson, Sandy, UT (US); Jeffrey G. Ballif, Highland, UT (US)

(73) Assignee: APS Technology 1 LLC, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,749

(22) Filed: Nov. 10, 2015

(65) Prior Publication Data

US 2016/0134546 A1    May 12, 2016

Related U.S. Application Data

(60) Provisional application No. 62/077,800, filed on Nov. 10, 2014.

(51) Int. Cl.
| | | |
|---|---|---|
| *H04L 12/801* | (2013.01) | |
| *H04L 12/46* | (2006.01) | |
| *H04L 12/825* | (2013.01) | |
| *H04L 12/26* | (2006.01) | |

(52) U.S. Cl.
CPC ........ *H04L 47/196* (2013.01); *H04L 12/4633* (2013.01); *H04L 47/12* (2013.01); *H04L 47/25* (2013.01); *H04L 43/0829* (2013.01); *H04L 43/16* (2013.01); *H04L 47/29* (2013.01)

(58) Field of Classification Search
None
See application file for complete search history.

(56) References Cited

U.S. PATENT DOCUMENTS

| | | | |
|---|---|---|---|
| 7,278,157 B2 * | 10/2007 | Jones | H04L 63/029 |
| | | | 726/12 |
| 7,752,330 B2 * | 7/2010 | Olsen | G06F 1/3209 |
| | | | 455/574 |
| 8,473,620 B2 * | 6/2013 | Demmer | H04L 41/12 |
| | | | 709/227 |
| 8,908,545 B1 | 12/2014 | Chen et al. | |
| 9,258,084 B2 * | 2/2016 | Zhovnirnovsky | H03M 13/616 |
| 9,860,022 B2 * | 1/2018 | Krigslund | H04L 1/0076 |
| 2010/0281258 A1 * | 11/2010 | Andress | H04L 63/0281 |
| | | | 713/168 |

(Continued)

FOREIGN PATENT DOCUMENTS

WO   WO 2014/074757 A2   5/2014

*Primary Examiner* — Willie J Daniel, Jr.
(74) *Attorney, Agent, or Firm* — Thorpe North & Western, LLP

(57) ABSTRACT

A technology is provided for improving computer network throughput. Data located in memory of a processing device may be identified. The data packets located in the memory may be sent through a tunneling interface to encapsulate the data packets using a tunneling protocol on a first computing device. Alternatively, the data packets can be sent through a split proxy interface system. The data packets received in the interface may also be encoded using random linear network coding (RLNC) to form encoded packets, using a processor. Further, the encoded packets may be sent across a packet network to a second computing device.

19 Claims, 11 Drawing Sheets

(56) References Cited

U.S. PATENT DOCUMENTS

| | | |
|---|---|---|
| 2012/0054583 A1 | 3/2012 | Park et al. |
| 2013/0195106 A1* | 8/2013 | Calmon ............. H04B 7/15521 |
| | | 370/389 |
| 2013/0235794 A1 | 9/2013 | Liu et al. |
| 2014/0269485 A1 | 9/2014 | Medard et al. |
| 2015/0109967 A1* | 4/2015 | Hogan .................. H04M 15/66 |
| | | 370/259 |
| 2015/0236819 A1* | 8/2015 | Zhovnirnovsky ......... H04L 1/08 |
| | | 370/216 |
| 2016/0191402 A1* | 6/2016 | Anderson .......... H04N 21/2402 |
| | | 370/236 |

\* cited by examiner

NETWORK THROUGHPUT

PRIORITY DATA

This application claims the benefit of U.S. Provisional Patent Application Ser. No. 62/077,800, filed Nov. 10, 2014, which is incorporated herein by reference.

BACKGROUND

Communications across computer networks have become a widely available form of communications. The communications can be between many forms of computing devices, including: mobile devices, servers, clients to servers, servers to clients, game consoles, desktop computers, laptops and a myriad of other computing devices. The form of data being sent in these communications usually takes the form of packets of information that are transmitted across networks between the computing devices.

Data may be transmitted through the internet using packets or chunks of information. Packet formatting and the method for delivering packets across the internet are governed by the protocol known as TCP/IP (transmission control protocol/internet protocol). For a TCP data transmission to be completed, the recipient TCP layer may collect the packets and organize the packets in the order in which the packets were sent. If a packet is lost, the protocol interprets this as a sign that the network is congested and then the transmission speed is immediately halved, and from there the packets speed attempts to increase again at a slow rate. This is beneficial in some situations and inefficient in other situation. Unfortunately, the TCP the protocol does not have the intelligence to know how to otherwise address problems in network congestion.

DETAILED DESCRIPTION

A technology is provided for improving network throughput of data packets sent through a network using random linear network coding (RLNC) in combination with network tunneling or proxy type systems. In the case of tunneling, each application may send the application packets through a separate tunneling interface such as a VPN interface, and then the VPN encapsulated packet may be encoded using RLNC and sent across the network using UDP (user datagram protocol). While the applications may each have a separate tunneling interface, the applications may alternatively share a common tunneling interface that can be RLNC encoded.

In configurations where a proxy type of interface is used, the packets may be sent through a split proxy arrangement. Alternatively, the data may be sent to an API (Application Program Interface) or to a socket interface which may then send packets to a server split proxy or a destination split proxy. In the API and socket case, the functionality of the client port of the split proxy may be embedded into the APIs or socket functionality.

Figure 1:
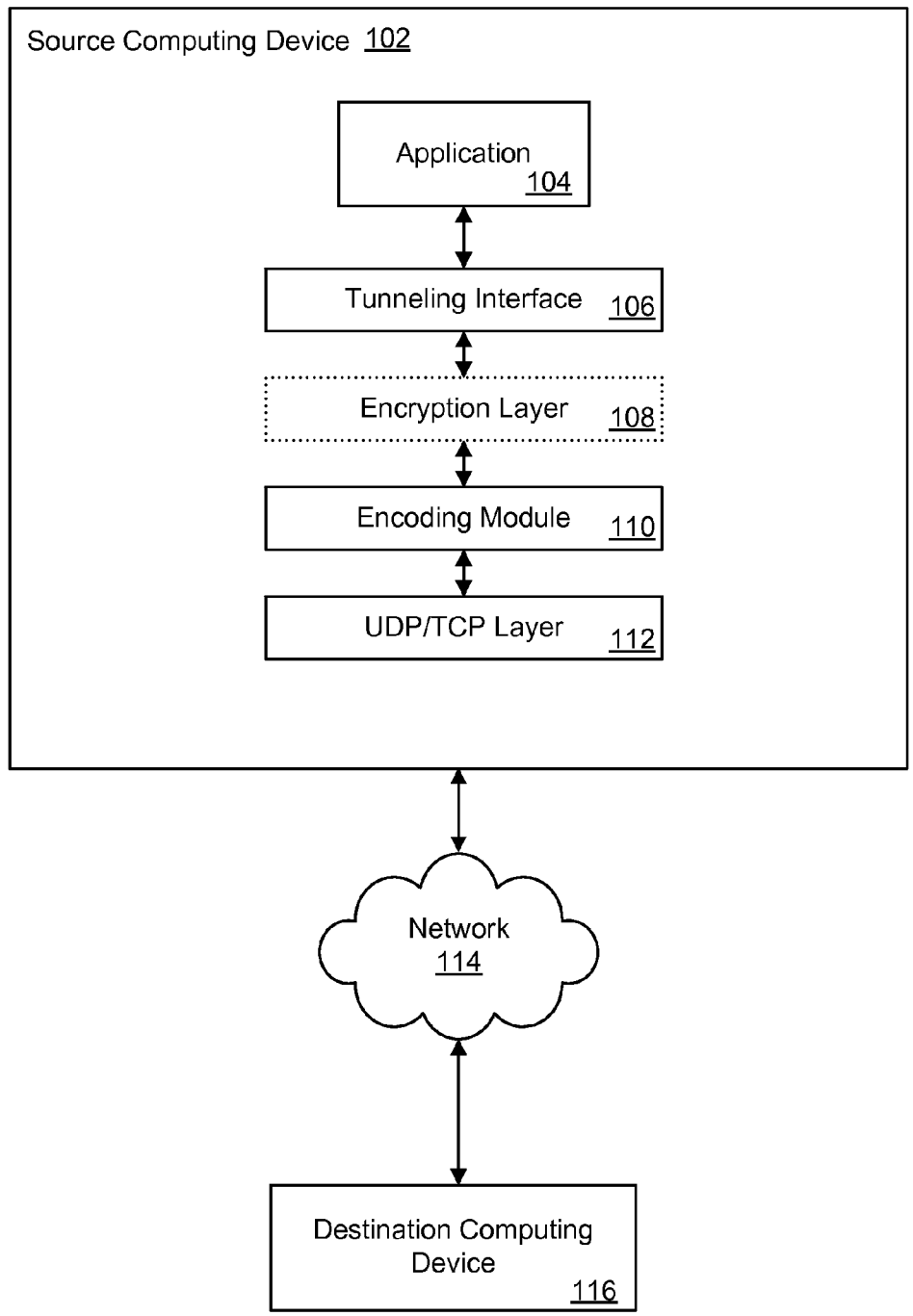
FIG. 1 is a block diagram illustrating an example of the technology using a tunneling interface and a RLNC (random linear network coding) encoding module to prepare data packets to be sent across a network.

FIG. 1 illustrates an example system that may include an application 104 on a source computing device 102 that is sending data packets through a network 114 such as the internet (e.g., through a hard wired connection or using a wireless connection such as Wi-Fi) or a cellular network which then communicates through the internet or another packet switched network. The application 104 maybe located in a memory device of a source computing device 102 (e.g., a client or server) configured to send data packets over a computer network 112. For example, the application 104 may be a content server executing on a hardware layer that is configured to deliver streaming video, streaming audio, text, web pages, or other content. Alternatively, the application 104 may be a client application requesting content.

A tunneling interface 106 can be configured to receive the data packets from the application 104 and encapsulate the data packets using the tunneling protocol. In one example, the tunneling interface may be a virtual private network (VPN), TAP (network tap) interface, a TUN (network TUNnel) interface, or another type of tunneling interface.

The use of a tunneling interface or VPN interface may enable the source computing device to use the RLNC encoding and decoding with multiple applications accessing the same tunneling interface on a device (e.g., a mobile device, desktop device, laptop, etc.) or in embedded hardware without specifically adding the RLNC layer or processing into each application. Further, each application may setup or access the application's own separate tunneling interface or VPN network interface. This way the traffic for the application can be funneled through the tunneling interface and may be connected with a single receiving device or server through the tunneling interface. Alternatively, a group of applications may share a tunneling interface that is destined for one or more destination computing devices 116 within a virtualized network or physical data center.

While a VPN interface is often encrypted, the use of encryption with the tunneling interface is optional as illustrated by the encryption layer 108 shown with dotted lines. Packets from the tunneling layer can be RLNC encoded and decoded with or without encryption. Therefore, in some configurations, if a user or application designer does not want the extra overhead of encryption but wants packet error correction using RLNC, such a configuration is available. The VPN interface may be used because the network traffic from multiple applications can be funneled through the interface.

Once the data packets have been encapsulated in the tunneling protocol, an encoding module 110 or encoder may receive the encapsulated packets and encode the data packets from the tunneling interface using random linear network coding (RLNC) to form coded data packets. Encoding the data packets in RLNC makes the group of data packets resistant to data packet loss and increases the speed of the data packet transmissions because lost data packets are not re-transmitted but are re-constructed at the destination computing device 116 or receiving software. A more detailed description of the underlying structure for computing RLNC will be discussed later.

A UDP/TCP (user datagram protocol/transmission control protocol) layer 112 can be configured to encapsulate and send the encoded data packets over the internet using UDP (user datagram protocol). Sending the packets using UDP (user datagram protocol) increases the speed of the transmission of the data packets but UDP does not guarantee the delivery of the data packets. RLNC is able to compensate for any packets that are lost by mathematically reconstructing the lost information on the destination computing device 116. The UDP packets can contain encoded TCP packets to transport the packets from the encoder to the destination decoder. If any control packets (e.g., with RLNC mathematical coefficients) are necessary to perform lost packet reconstruction, these packets can be sent using the TCP or UDP protocol.

The encoded data packets may be sent across a network 114, and the data packets may be received at a destination computing device 116. Once the data packets are received at the destination computing device 116 then the data packets may be decoded using the RLNC and the encapsulation may be removed when the data packets arrive at the destination tunneling protocol layer (e.g., destination virtual network). In one example, this virtual network will be a virtual private network formed between two applications.

The source computing device 102 may transfer any type of data that an application 104 may be configured to send to a destination computing device 116. For example, files, videos, database transactions, web pages, ebooks, audio, voice over internet protocol (VOIP) or other information may be located on the server and the packets for that data may be sent through the tunneling interface, encoding module and UDP/TCP layers as described above. Because the packets passing through the tunneling interface may be encoded by RLNC and sent via UDP this increases the overall speed of the data packets being sent.

The communication layering illustrated in FIG. 1 on the source computing device 102 may also exist on the destination computing device 116. Packets that are received by the destination computing device 116 will be processed through communications layers in the reverse order that the encapsulation and decoding originally took place in order to obtain the actual data that was sent in the data packets.

Figure 2:
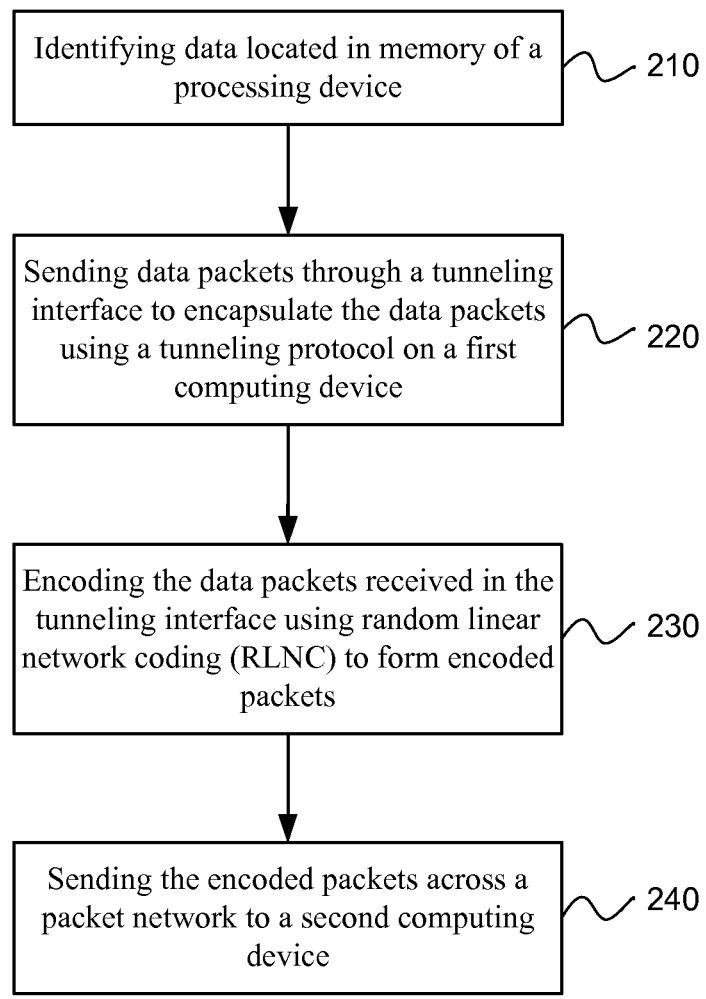
FIG. 2 is an example of a flowchart illustrating a method for sending data packets across a network using a tunneling interface and RLNC (random linear network coding) encoding.

FIG. 2 illustrates an example method for improving network throughput of data packets in a network. An initial operation can be identifying data located in memory of a processing device, as in block 210. This data may be video, audio, text, gaming data, web site data or other data to be sent across the internet. Data packets with the data from the memory can be sent through a tunneling interface to encapsulate the data packets using a tunneling protocol on a first computing device, as in block 220. The tunneling protocol may be a VPN protocol.

The data packets received in the tunneling interface may be encoded using random linear network coding (RLNC) to form encoded packets, as in block 230. A further operation is sending the encoded packets across a packet network to a second computing device, as in block 240. The encoded data packets may be encapsulated into UDP (user datagram protocol) packets in order to send them across the packet network using an IP (internet protocol) network.

Once the packets are transmitted across the internet, the packets may arrive at a second computing device. The second computing device can have a processor to decode the encoded data packets at the second computing device using RLNC. This can include regenerating lost packets using RLNC.

In an optional step, encryption may be applied to the data packets sent through the tunneling interface before the data packets are RNLC encoded and sent across the network. This encryption may be applied after the data packets are encapsulated in the tunneling protocol. The encryption may be contained in the tunneling interface or the encryption may be a separate interface or layer that operates before the RLNC encoding takes place.

Figure 3A:
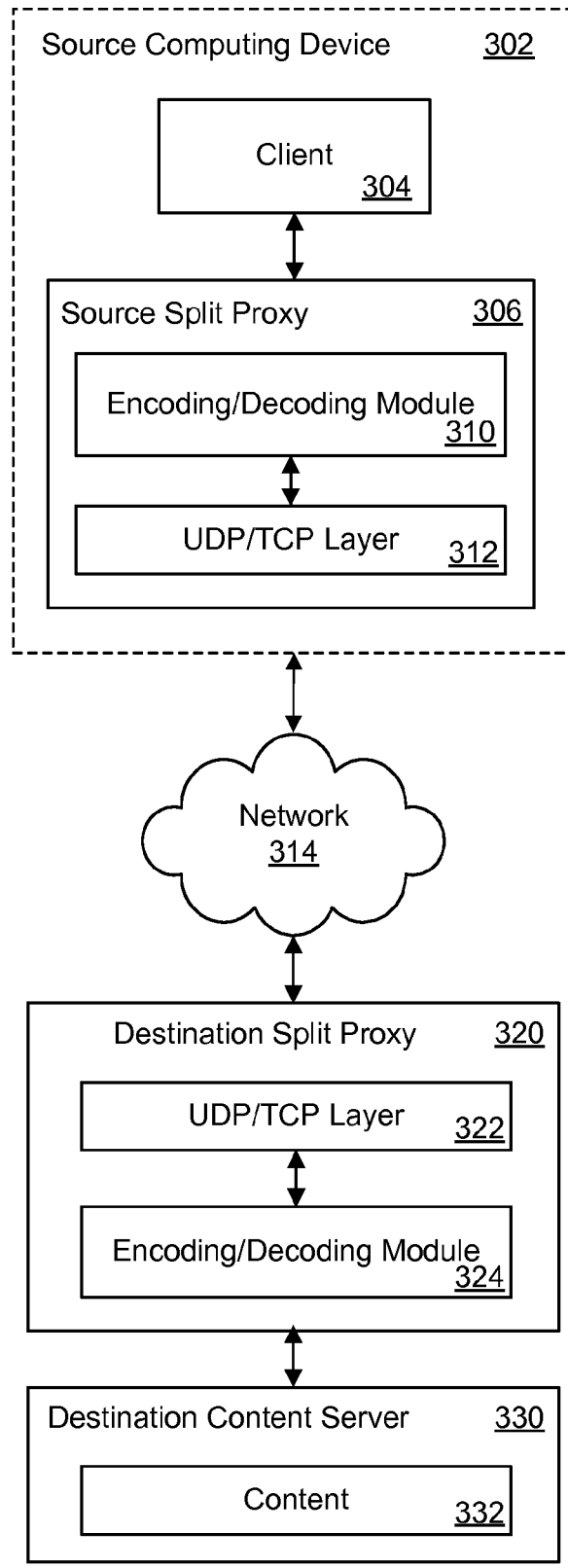
FIG. 3a is a block diagram illustrating an example of using a split proxy in combination with a client in the present technology.

FIG. 3a illustrates a block diagram for avoiding a slow down in communications over the network when the RLNC process is being applied and communicated across a network. Specifically, the TCP slow start algorithm can create network latency issues due to delays in encoding and latency in the TCP ACK (acknowledgement) packet roundtrip using the RLNC technology. Because the encoding and decoding add delay into the TCP connection, this may create a situation where the TCP algorithm is constantly in slow start mode. This causes large round trip delays and very slow throughput performance.

To overcome this problem, FIG. 3a illustrates that a split proxy or a proxy on each frontend of the RLNC encoding layer may be provided to overcome the client's TCP slow start mode. The proxy on the receiving side can receive the packets from the sending proxy and acknowledge that the packets are received long before the application receiving the packets can acknowledge the packets. Thus, a client can send the TCP packets (e.g., in UDP form) as fast as possible to the frontend of the proxy containing or in communication with the encoder, when a client is sending information to a server. The same thing can also occur on a server side for decoding.

FIG. 3a illustrates that a source computing device 302 may contain a client 304. The client may be browser, an application or another type of executable that can consume data requested from a server over a computer network. In one example, the data may be streaming audio data or video data. The client 304 may be configured to make requests through a specified port on a source split proxy 306. The request made via the source split proxy 306 may be encoded using RLNC using by the encoding and decoding module 310. The request may then be encapsulated in a UDP wrapper or UDP layer. In some cases, the packet may be a TCP packet that is encoded and then encapsulated as a UDP packet.

The incoming data from the client 304 or application may be partitioned in a way to enable encoding the incoming data efficiently. For example, the incoming data may be partitioned to create variable block sizes. In one case, the encoding block size may be variable based on destination port of the TCP packet, TCP packet contents, and/or network congestion measurements. The network congestion measurements can be obtained by the RTT (round trip time) of the decoded ACK (acknowledgement) packets. Alternatively, the encoding block size and timeout time may be set manually at program start time. In one case, a group of ten packets, 20 packets, 50 packets, or more packets may be decoded as a group using the RLNC encoding, and when an entire group of packets has been decoded, then an ACK (acknowledgement) may be sent from the destination split proxy 320 to the source split proxy 306, and the source split proxy 306 can use the ACK as a notification that another block of packets may be sent.

The UDP packet may be sent across a network 314, such as the internet, to a destination split proxy 320. The destination split proxy can immediately acknowledge that a packet or group of packets was received so that the source split proxy 306 will know that more packets may be sent. More specifics about the mechanism for managing packet speed between the two proxies will be discussed later. A UDP packet with the data can be de-encapsulated from its UDP wrapper 322. Then the packet will decoded using the RLNC decoding in the encoding and decoding module 324. If some packets have been lost, then additional RLNC coefficients (not packet data) will be requested until the lost packets can be rebuilt.

The request for the data or content will be forwarded to the destination content server 330 which will then send the requested data or content back to the client. In one example, the request may initiate the streaming of data, such as video, audio, gaming data or other streamed data. The process for sending the data back to the client 304 may then operate in reverse.

When the clients and destination content servers connect to the source split proxy and the destination split proxy, authentication protocols may be used to verify that a client or server has the rights to connect to that proxy. The authentication that takes place make be any type of authentication that currently exists for proxies or servers.

In one configuration, the speed at which UDP packets are sent may be controlled (e.g., throttled) using a token passing scheme to make the speed at which packets are sent more fair on the network (e.g., the internet) and to the ISP (internet service provider). For example, a set number of tokens may be provided to be shared for the encoding session between the sending device (source split proxy) and receiving device (destination split proxy). If 500 tokens start out with the sender, each time a data packet is sent, then a token is consumed and the data packet sent to the receiving device. Then when the data packet or group of data packets is acknowledged as being RLNC decoded, the tokens may be used again at the sending device. Additional factors may be used to determine how frequently a token may be used and a packet sent. Examples of such factors include: the number of tokens a source split proxy has, how much time has passed since the last block was sent, a number of packets that still need to be decoded or other factors. A sending device may only send packets for which the sending device has a token. The total number of tokens (e.g., 500, 1000 or 5000 tokens) that are available for a session may be based not only on network latency but also on the network service type. For example, if the packet is a streaming video packet based on the content and service being used, then the number of tokens used and the packets can get a bump in priority over an SMTP (Simple Mail Transfer Protocol) packet. This token oriented configuration can help avoid overloading a host network or having administrative actions taken by a network administrator against the split proxy.

While the terms source split proxy 306 and destination split proxy 320 may be used extensively in this description, the proxies may also be considered as client and server split proxies. For example, a client split proxy may be located on the client side with respect to content requests and a server split proxy may be located on a server side with respect to a content request. Alternatively, the direction in which requests are made through the split proxy, as described here, may be reversed if requests are being made from the server side of the split proxy system to a client.

The destination split proxy 320 may be located in a private or public service provider environment (e.g., a cloud, grid, blade server, or cluster) that is the same environment within which the destination content server 330 is hosted. Alternatively, the destination split proxy may be contained in a different service provider environment or with a different hosting party than the destination content server 330.

Further, the split proxies may be hosted in a virtualized computing system as virtual machines. Alternatively, the split proxies may be standalone servers, dedicated devices or other hardware machines to host the split proxies.

In one configuration of the technology, API (application program interface) calls may be used instead of a split proxy. In such cases, the client or application can send the data to a socket via API calls that are then encoded with RLNC and encapsulated using UDP and sent over to the destination proxy. In a similar configuration, the data can be sent directly to a network socket that will perform the same functions as the source split proxy 306 and send the packets to the destination split proxy 320, as described earlier. As a further alternatively, web APIs may be used to send the data to a service or a web service that acts as the source split proxy.

Figure 3B:
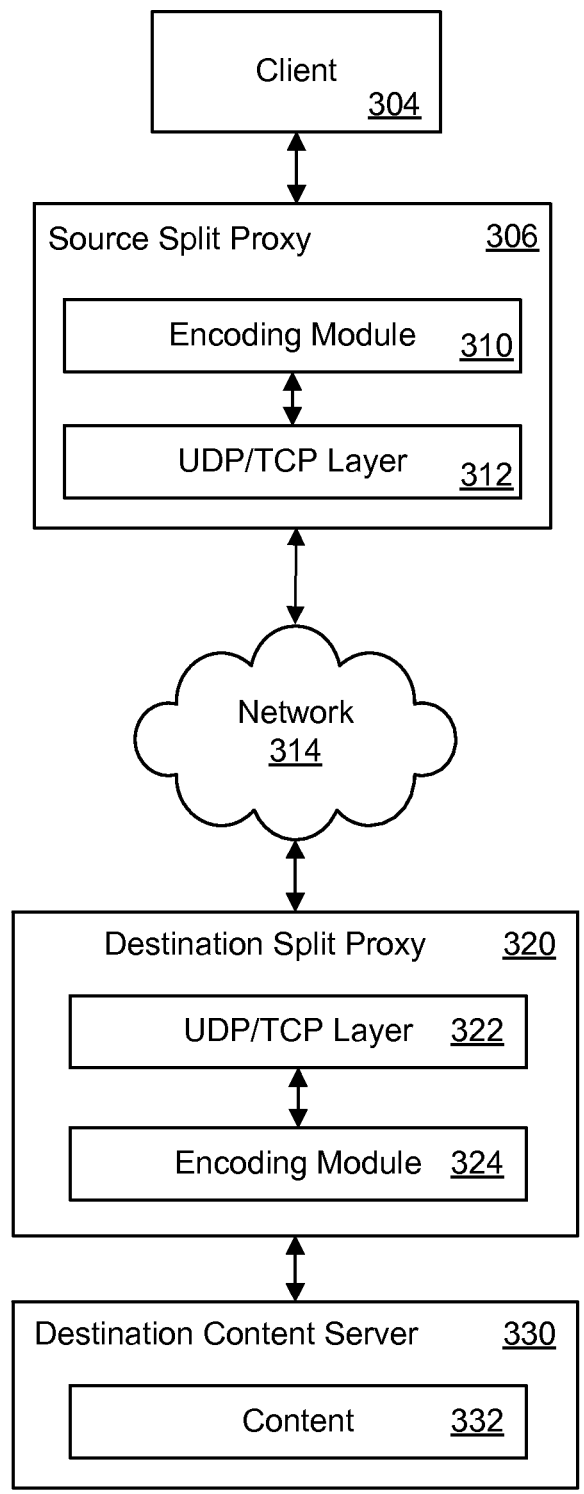
FIG. 3b is a block diagram illustrating an example of using a split proxy that is separate from a client in the present technology.

FIG. 3b illustrates that the client 304 may be on a separate computing device or separate physical hardware device than the source split proxy 306. For example, the client 304 may be located on a mobile device, a laptop, a set-top box or something device that is separate from the source split proxy 306. Separate servers, virtualized servers, and/or other pieces of hardware or software may be used for each of source and destination split proxies. In some implementations, the destination split proxy 320 will be an independent server that is in physical proximity or low latency proximity to the content server 330 so that the round trip communication time between the destination split proxy 320 and the content server 330 is low.

Figure 4:
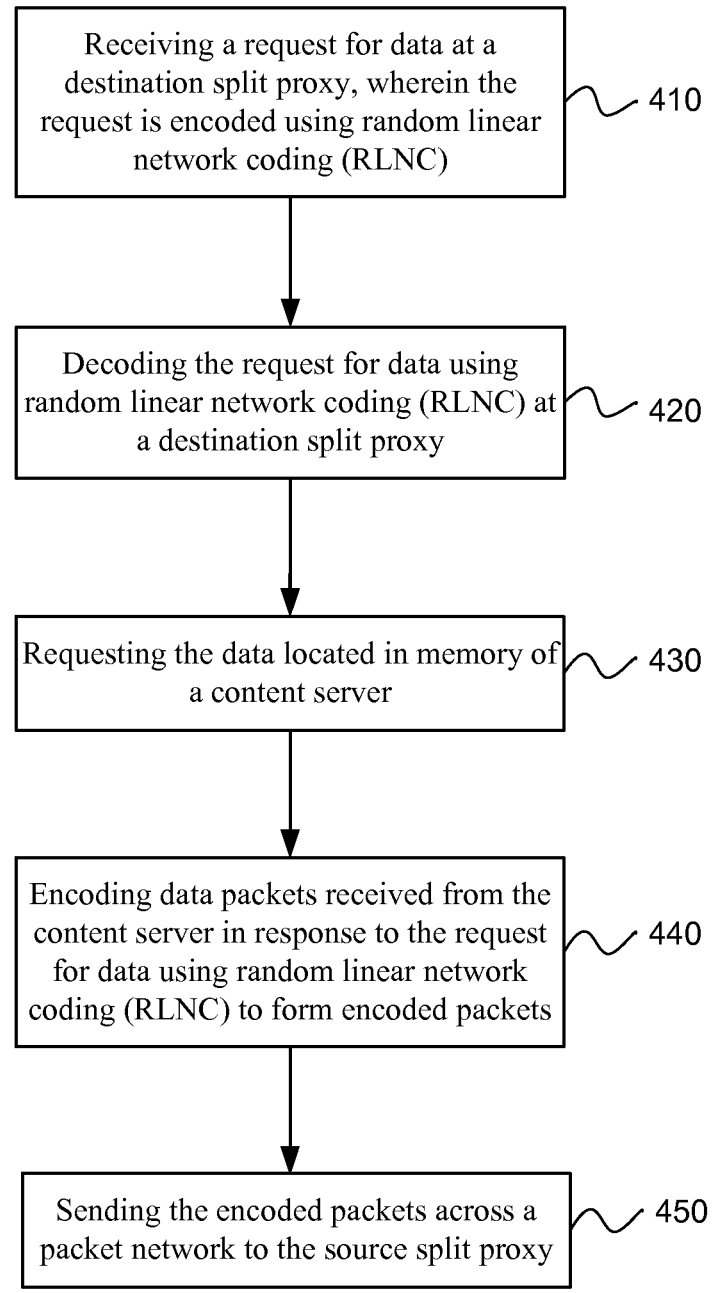
FIG. 4 is a flow chart illustrating an example method of using a split proxy with the present technology.

FIG. 4 is a flow chart illustrating a method for improving network throughput. The method may include the operation of receiving a request for data at a destination split proxy, as in block 410. The request for data can come from a source split proxy and ultimately from a client. The request can be encoded using random linear network coding (RLNC) and be received from a source split proxy. Another operation is decoding the request for data using random linear network coding (RLNC) at a destination split proxy, as on block 420

The data located in memory of a content server can be requested, as in block 430. Further, the data packets received from the content server in response to the request for data can be encoded using random linear network coding (RLNC) to form encoded packets, as in block 440. The encoded packets can then be sent across a packet network to the source split proxy as in block 450. The source split proxy and the destination split proxy can communicate using UDP (user datagram protocol) packets which further contain the packets (e.g., TCP packets) that are RLNC encoded.

On the return trip, the encoded packets with the data can be decoded at the source split proxy using random linear network coding (RLNC) to form decoded packets. The decoded packets can then be sent to a client or application for consumption or use. The client may be a browser, a mobile device, an application, or another type of networked computer.

Figure 5:
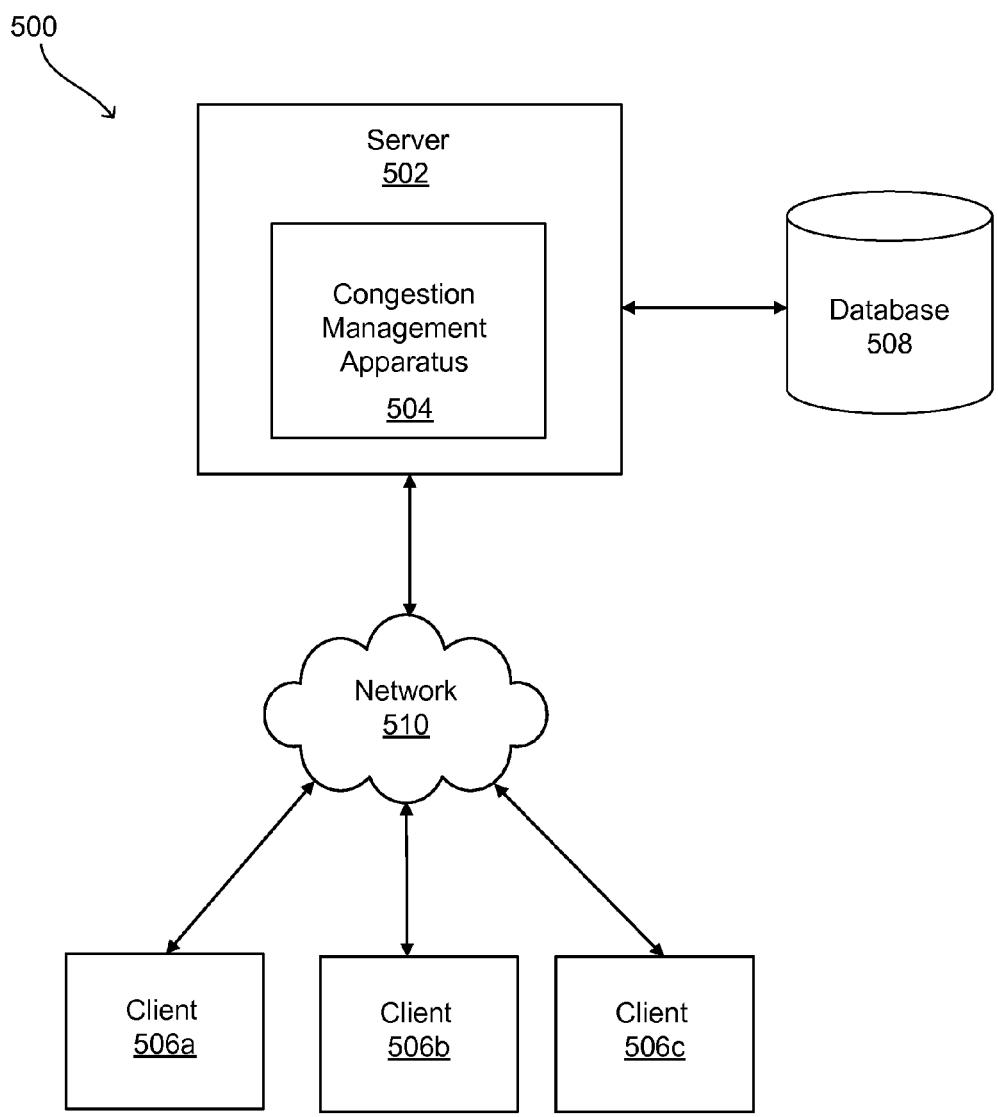
FIG. 5 is a block diagram illustrating an example of a system for managing congestion in a computer network.

FIG. 5 is a schematic block diagram illustrating one configuration of a system for reducing network congestion through the use of random linear network coding. The system 500 can include a server 502 with a congestion management apparatus 504 connected to multiple clients 506a-c (collectively, 506) through a network 510, and a database 508, which are described further below. The congestion management apparatus 504 may be in communication with the tunneling and proxy systems described above to determine whether or not to use RLNC encoding at a given point in time.

The system 500 includes clients 506a-c in communication with a server 502 having a congestion management apparatus 504 through a network 510. The server 502 may be any computer accessible by a client 506 over a network 510, including but not limited to a gateway, router, mainframe server, or proxy server. For example, the server 502 can be a gateway that connects the client 506 to the Internet, cloud-based servers, or another client 506. The network 510 connecting the server 502 and the client 506 may include a local area network ("LAN"), a wide area network ("WAN"), a wireless network, a cellular network, the Internet, or the like. The database 508 may be any form of data storage, including but not limited to a relational database or a flat file. The database 508 can be hosted on the server 502 or a separate server. The congestion management apparatus 504 may reside solely on server 502. In one embodiment, the congestion management apparatus 504 resides in part on the server 502 and in part on the client 506. In another embodiment, the congestion management apparatus 504 resides in part on the server, in part on the client 506, and also in part on a different server hosting the database 508. The congestion management apparatus 504 is described in more detail with respect to the apparatus 600 in FIG. 6.

The client 506 may be an electronic device or a software application running on a mobile electronic device. The client 506 as an electronic device may be a smartphone, a tablet computer, a laptop computer, a desktop computer, a digital media player (e.g., Apple TV), a network appliance, a gaming console (e.g., PlayStation, Xbox, Wii) or the like. The client 506 as a software application may be a VPN (virtual private network) client and/or an application running on a mobile electronic device.

The client 506 is capable of encoding data packets using random linear network coding (RLNC) and sending these data packets, as well as receiving and decoding data packets encoded using random linear network coding. Random linear network coding enables (i) a receiver (e.g., the server 502 or the client 506) to ignore lost data packets sent by the transmitter (e.g., the server 502 or the client 506) and only acknowledge the receipt of certain data packets and (ii) a transmitter to avoid retransmitting data packets, thus reducing network congestion, and is explained further below with respect to the network coding module 606 in FIG. 6.

Figure 6:
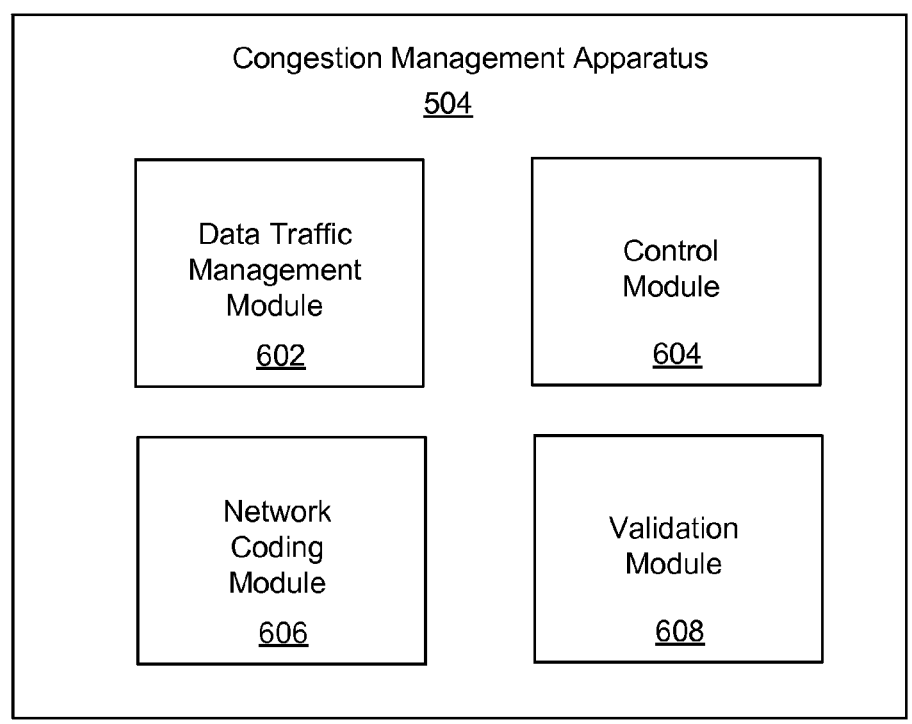
FIG. 6 is a block diagram illustrating an example of details of a congestion management apparatus.

FIG. 6 is a schematic block diagram illustrating one embodiment of an apparatus for reducing network congestion through the use of random linear network coding. The apparatus 600 includes a data traffic measurement module 602, a control module 604, a network coding module 606, and a validation module 608, which are described below.

The data traffic measurement module 602 determines a data loss rate pertaining to a datastream between the server 502 and the client 506. A datastream includes data packets sent and received between the server 502 and the client 506. In one embodiment, the data traffic measurement module 602 can simultaneously determine the data loss rate pertaining to multiple datastreams between the server 502 and multiple clients 506. The data loss rate pertaining to a datastream may be defined in different ways. In one embodiment, the data loss rate is the total number of data packets sent by either (i) the server 502, (ii) the client 506, or (iii) both the server 502 and the client 506, but not received by the server 502 or the client 506 over a set period of time. For example, the data loss rate may be, during a one second interval, the total number of data packets sent by the client 506 to the server 502 that was not received by the server 502. In another embodiment, the data loss rate is the total number of data packets resent by (i) the server 502, (ii) the client 506, or (iii) both the server 502 and the client 506 over a set period of time. An example of the data loss rate using this definition may be, during a one second interval, the total number of data packets resent by server 502 to the client 506.

A data loss rate above a certain threshold has an adverse impact on the performance of real-time software applications running on the server 502 and/or the client 506, including but not limited to video teleconferencing, video streaming, and network heavy online multiplayer games. Thus, measuring the data loss rate between the server 502 and the client 506 will help identify when network congestion is severely impairing the functionality of these applications. To more accurately measure the average data loss rate between the server 502 and the client 506, it will be advantageous to vary the window of time during which the data traffic measurement module 602 counts the total number of data packets lost, was asked to be retransmitted, or resent. Thus, for example, the data traffic measurement module may count the total number of data packets lost between the server 502 and the client 506 over a five second interval. A longer sampling window gives the congestion management apparatus 504 a better understanding of the state of congestion within the network between the server 502 and the client 506 by blunting the impact of momentary spikes or dips in network congestion. A shorter sampling window allows the congestion management apparatus 504 to more quickly react to changes in network congestion.

The data traffic measurement module 602 may determine the data loss rate pertaining to a datastream between the server 502 and the client 506 either continuously, at regular intervals (e.g., every 30 seconds), and/or at scheduled times (e.g., during peak network usage hours). Determining the data loss rate pertaining to a datastream continuously allows the data traffic measurement module 602 to maintain a moving window average of the data loss rate. For example, the data loss rate determined by the data traffic measurement module 602 may be the average of the most recent three data loss rates measured. In another example, the data loss rate determined by the data traffic measurement module 602 may be the weighted average of the most recent five data loss rates measured, with the more recently measured data loss rates weighted more heavily.

The control module 604 causes the server 502 and the client 506 to send to and receive from each other data packets encoded using random linear network coding. In one embodiment, the control module 604 causes the server 502 and the client 506 to send to and receive from each other data packets encoded using random linear network coding in response to the data traffic measurement module determining that the data loss rate is higher than or equal to a first threshold. The control module 604 also causes the server 502 and the client 506 to stop sending and receiving data packets encoded using random linear network coding between each other. In an embodiment, the control module 604 causes the server 502 and the client 506 to stop sending and receiving data packets encoded using random linear network coding between each other in response to the data traffic measurement module determining that the data loss rate is lower than a second threshold.

In one embodiment, the first threshold and the second threshold are identical. But in another embodiment, the first threshold and the second threshold are different, with the first threshold greater than the second threshold. As explained further below, encoding data packets using random linear network coding increases overhead in terms of both packet header size and time spent encoding and decoding packet payloads. Thus, in certain scenarios, encoding data packets using random linear network coding will actually increase network congestion and result in lower data throughput rates. The first threshold and the second threshold should preferably be set to data loss rates that balance their effect on the performance of real-time software applications with maintaining the highest data throughput rates. For example, assuming that a data loss rate above 20 packets per second will result in choppy video streaming between the server 502 and the client 506, the first threshold may be set to 18 or 19 packets per second so that a higher data loss rate will cause the server 502 and the client 506 to encode data packets using random linear network encoding. In this example, the second threshold may be identical to the first threshold, or it may be set at a lower threshold to maintain a higher data throughput between the server 502 and the client 506.

Just as the control module 604 can turn on and turn of the application of the RLNC to the data packets, the control module 604 can also turn on or turn off the use of tunneling. In one case, when the RLNC is turned off, the use of tunneling (e.g., a VPN) may be turned off simultaneously. The ability to turn on or off RLNC and the tunneling may be available for each interface independently or the system may be configured to turn on or off both interfaces simultaneously. For example, if the RLNC is configured to be accessed through the use of tunneling, then turning off the tunneling may by-pass the RLNC without explicitly turning off the application of the RLNC. Similarly, turning off the application of RLNC may automatically turn off the use of tunneling.

The network coding module 606 encodes data packets using random linear network coding and decodes data packets encoded using random linear network coding. Traditional TCP/IP transmission divides data content into sequentially numbered packets and sends each packet with its accompanying sequence number. If a packet (i) does not arrive at its destination and therefore an acknowledgement is not sent to the origin or (ii) an acknowledgement is sent but does not arrive at the origin within a specific window of time, the packet is resent. In random linear network coding, data are divided into data blocks and encoded into coded data packets. Each coded data packet is formed by multiplying each data block with a constant chosen randomly from a finite range of constants and then combining the results. Thus, each coded data packet can be represented by a linear equation in the following form:

$$CDP1 = C_{1,1} \times DB_{1,1} + C_{1,2} \times DB_{1,2} + \ldots + C_{1,n} \times DB_{1,n}$$

$$CDP2 = C_{2,1} \times DB_{2,1} + C_{2,2} \times DB_{2,2} + \ldots + C_{2,n} \times DB_{2,n}$$

$$CDPk = C_{k,1} \times DB_{k,1} + C_{k,2} \times DB_{k,2} + \ldots + C_{k,m} \times DB_{k,m}$$

Here, CDP represents a "coded data packet," DB represents a "data block," and C represents a randomly chosen constant from a finite range of constants.

The randomly chosen constant $C_{k,m}$ multiplied with each data block are encoded in the headers of the coded data packets in which they are used. Assuming there are n data blocks to be sent, coded data packets are sent continuously until n distinct (i.e., linearly independent) coded data packets are received and acknowledged. Once n distinct coded data packets are received, they can be decoded to find the n data blocks. Alternatively, some individual coded data packets can be decoded as they are received. For example, given m distinct coded data packets encoded using a total of p unique data blocks, where m≥p, it is possible to decode the m coded data packets to find the p data blocks.

The number of data blocks used to encode a coded data packet can vary. In certain situations, it is advantageous to encode a coded data packet with a larger set of data blocks (i.e., a larger number of data blocks). For example, when the data loss rate in the network reaches a certain threshold, encoding a coded data packet with a larger set of data blocks is desirable because each distinct coded data packet received will contain more data blocks that can be decoded. Thus, in one embodiment, the network coding module 606 increases the number of data blocks used to encode a coded data packet in response to the data traffic measurement module 602 determining that the data loss rate is higher than to the first threshold. In other situations, it is advantageous to encode a coded data packet with a smaller set of data blocks (i.e., a smaller number of data blocks). An increase in the number of encoded data blocks leads to an increase in packet header size (due to a corresponding increase in the number of constants $C_{k,m}$ encoded in the packet header) and packet payload size, as well as increases in time required to encode and decode the coded data packets. Thus, when the data loss rate in the network 310 is very low, encoding a coded data packet with a smaller set of data blocks is desirable because it reduces the overhead associated with encoding a larger number of data blocks. Thus, in one embodiment, the network coding module 606 decreases the number of data blocks used to encode a coded data packet in response to the data traffic measurement module 602 determining that the data loss rate is between the first threshold and the second threshold.

As explained above, random linear network coding adds overhead in terms of time required to encode and decode the coded data packets, as well as an increase in the size of the coded data packet header to include the randomly chosen constants. But the overhead incurred is typically small compared to the efficiency gained by the transmitter (e.g., the server 502 or the client 506) not having to retransmit lost coded data packets and the receiver (e.g., the server 502 or the client 506) only having to acknowledge the receipt of every distinct coded data packet. Since it is possible that not all coded data packets created by random linear network coding are distinct, the transmitter may have to send more than n coded data packets in order for n distinct coded data packets to be received. Thus, if network congestion is low and there is very little to no packet loss, sending coded data packets encoded using random linear network coding may use more network bandwidth compared to encoding and sending data packets using the traditional TCP/IP transmission protocol.

The validation module 608 authenticates the client 506 and determines whether the client 506 possesses valid authorization to encode and decode data packets using random linear network encoding. In one embodiment, the control module 604 causes the server 502 and the client 506 to send to and receive from each other data packets encoded using random linear network coding in response to the validation module 608 authenticating the client 506 and determining that the client 506 possesses valid authorization. The database 308 stores a unique identifier for each client 506. This identifier can be a unique alphanumeric code, picture, or other authentication token. For example, the stored identifier may be an encrypted hash of a client's 506 MAC address. The database 308 also stores an indicator of whether the client 506 is authorized to encode or decode data packets using random linear network coding. In another embodiment, the control module 604 causes the server 302 and the client 506 to stop sending and receiving data packets encoded using random linear network coding between each other in response to the validation module 608 determining that the client 506 lacks valid authorization.

Figure 7:
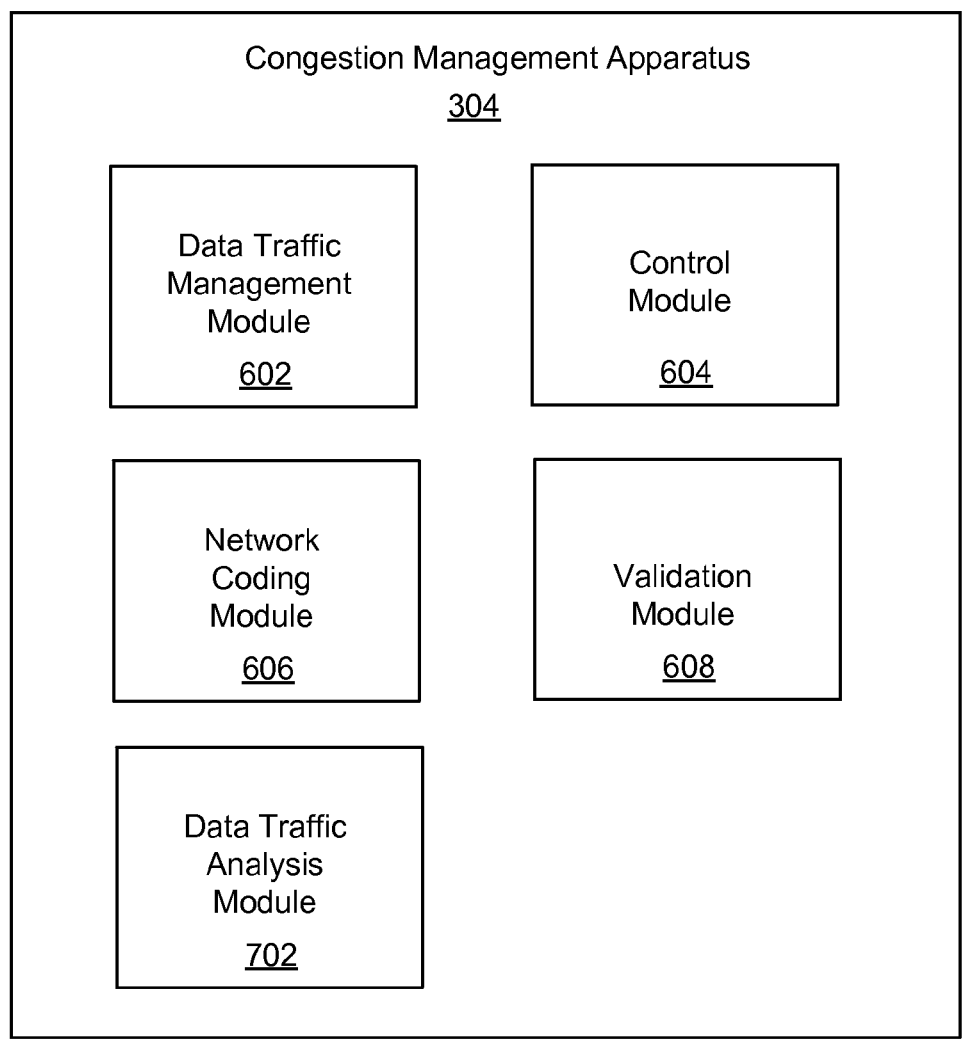
FIG. 7 is block diagram illustrating an example of a congestion management apparatus with a data traffic analysis module.

FIG. 7 is a schematic block diagram illustrating another embodiment of an apparatus for reducing network congestion through the use of random linear network coding. The apparatus 700 includes a data traffic measurement module 602, a control module 604, a network coding module 606, a validation module 608, and a data traffic analysis module 702. The data traffic measurement module 602, the control module 604, the network coding module 606, and the validation module 608 have been described above. The data traffic analysis module 702 is described below.

The data traffic analysis module 702 records one or more characteristics of the datastream between the server 502 and the client 506. A characteristic of the datastream between the server 502 and the client 506 is the data loss rate pertaining to the datastream at various times (e.g., 8 a.m. to 5 p.m., day, week, month, Mondays, weekends, New Year's Day). Another characteristic of the datastream between the server 502 and the client 506 is the rate of change in the data loss rate pertaining to the datastream at various times. Yet another characteristic of the datastream between the server 502 and the client 506 is the data throughput rate pertaining to the datastream at various times. Still another characteristic of the datastream between the server 502 and the client 506 is the rate of change in the data throughput rate pertaining to the datastream at various times.

The one or more characteristics of the datastream between the server 502 and the client 506 may be stored in the database 308 and/or on the server 502 and allows other modules to leverage the one or more recorded datastream characteristics to provide additional functionality for the congestion management apparatus 504. In one embodiment, the data traffic measurement module 602 changes the manner and/or frequency with which it determines the data loss rate for the datastream based upon an analysis of the one or more characteristics of the datastream recorded by the data traffic analysis module 702. For example, the data traffic measurement module 602 may analyze the one or more characteristics of the datastream between the server 502 and a particular client 502 recorded by the data traffic analysis module 702 and determine that the datastream's data loss rate during a certain time (e.g., midnight to 5 a.m.) is consistently low. As a result, the data traffic measurement module 602 may lengthen the sampling window for measuring the data loss rate and also lengthen the interval between the times when it determines the data loss rate during that time. In another example, the data traffic measurement module 602 may analyze the one or more characteristics of the datastream between the server 502 and another client 502 recorded by the data traffic analysis module 702 and determine that the datastream's data loss rate varies greatly during a specific time of day (e.g., noon to 3 p.m.). In response, the data traffic measurement module 602 may shorten the sampling window for measuring the data loss rate and also continuously monitor the data loss rate during that time.

In another embodiment, the control module 604 causes the server 502 and the client 506 to send to and receive from each other data packets encoded using random linear network coding in response to an analysis of the one or more characteristics of the datastream recorded by the data traffic analysis module 702. In an additional embodiment, the control module 604 causes the server 502 and the client 506 to stop sending and receiving data packets encoded using random linear network coding between each other in response to an analysis of the one or more characteristics of the datastream recorded by the data traffic analysis module 702. For example, the control module 604 may analyze the one or more characteristics of the datastream between the server 502 and the client 506 recorded by the data traffic analysis module 702 and determine that a datastream's data loss rate, as well as the rate of change of the data loss rate, is low during a certain time of day (e.g., 8 a.m. to 3 p.m.). In response, the control module 604 may cause the server 502 and the client to stop sending and receiving data packets encoded using random linear network coding between each other during that time.

Figure 8:
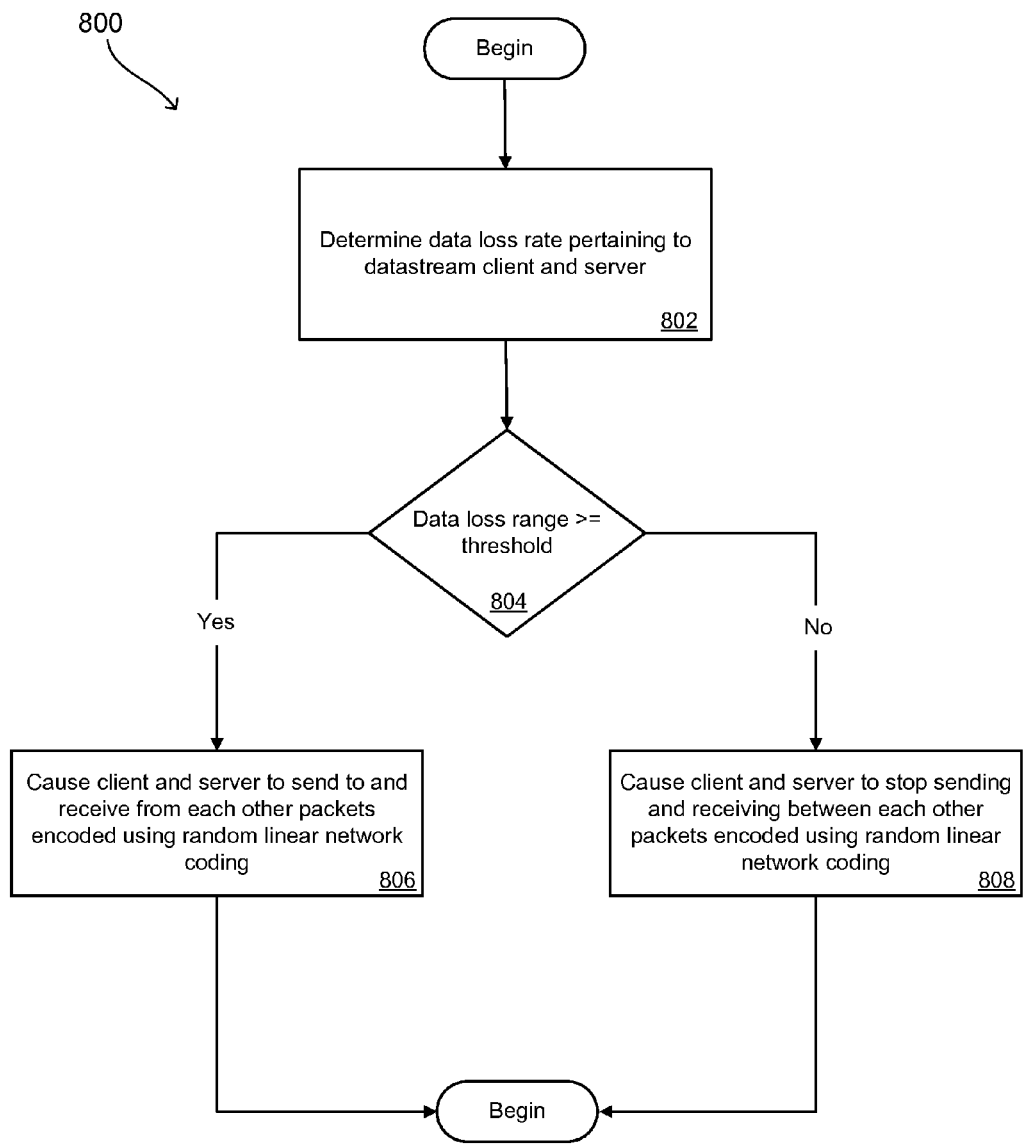
FIG. 8 is a flowchart illustrating an example of checking a data loss range against a threshold to determine whether to apply RLNC (random linear network coding).

FIG. 8 is a flow chart diagram illustrating one embodiment of a method for reducing network congestion through the use of random linear network coding. The method 800 begins and determines 802 the data loss rate pertaining to a datastream between a server 502 and a client 506. The method 800 determines 804 whether the data loss rate is greater than or equal to a threshold. If the data loss rate is greater than or equal to the threshold, the method 800 causes 806 the server 502 and the client 506 to send to and receive from each other data packets encoded using random linear network coding and the method 800 ends. If the data loss rate is not greater than or equal to the threshold, the method 800 causes 808 the server 502 and the client 506 to stop sending and receiving data packets encoded using random linear network coding between each other and the method 800 ends.

Figure 9:
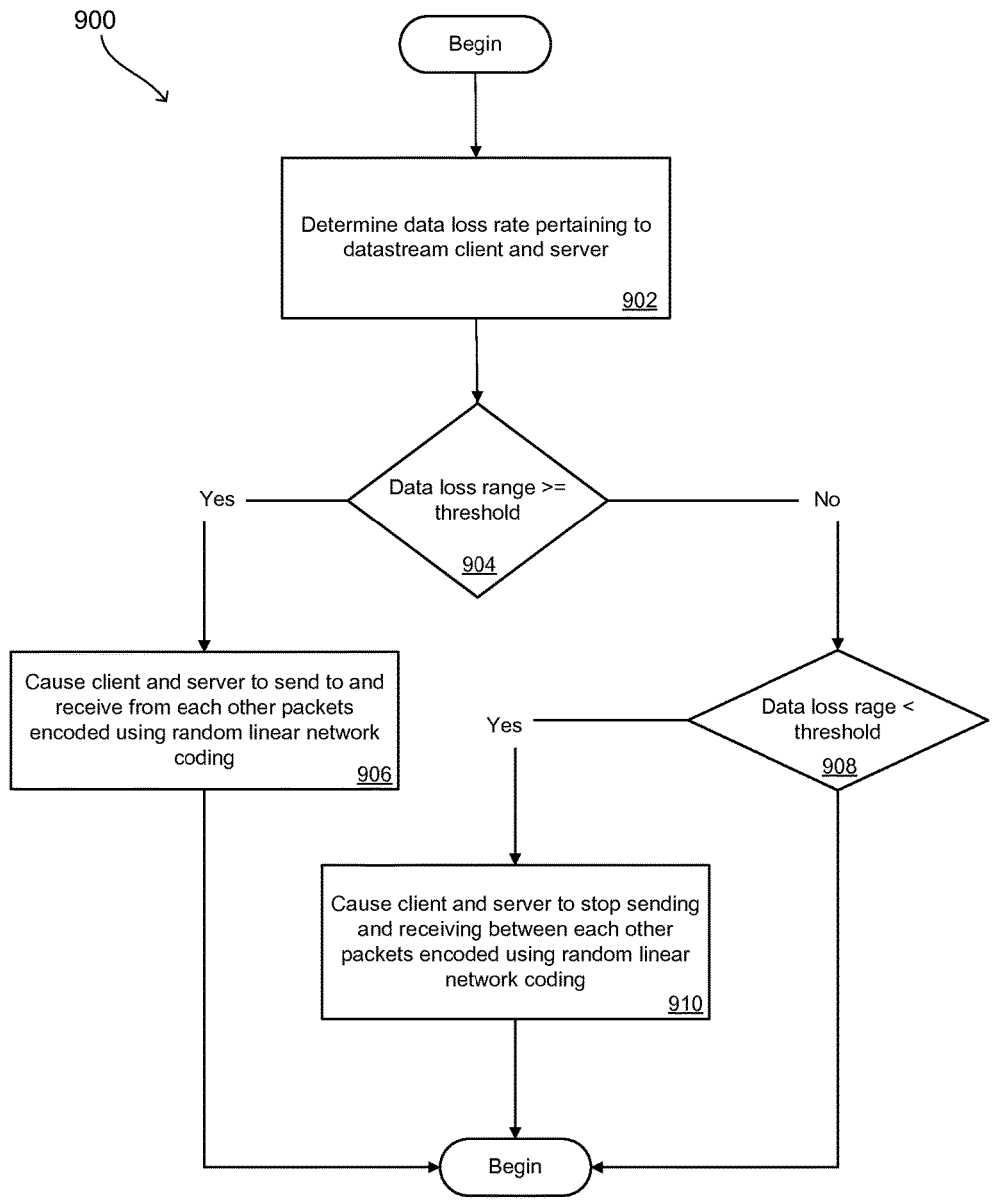
FIG. 9 is a flowchart illustrating checking an example of a data loss range against two thresholds to determine whether to apply RLNC (random linear network coding).

FIG. 9 is a schematic flow chart diagram illustrating another embodiment of a method for reducing network congestion through the use of random linear network coding. The method 900 begins and determines 902 the data loss rate pertaining to a datastream between a server 502 and a client 506. The method 900 determines 904 whether the data loss rate is greater than or equal to a first threshold. If the data loss rate is greater than or equal to the first threshold, the method 900 causes 906 the server 502 and the client 506 to send to and receive from each other data packets encoded using random linear network coding and the method 900 ends. If the data loss rate is not greater than or equal to the first threshold, the method 900 determines 908 whether the data loss rate is less than a second threshold. In one embodiment, the first threshold and the second threshold are different, with the first threshold higher than the second threshold. If the data loss rate is less than the second threshold, the method 900 causes 910 the server and the client to stop sending and receiving data packets encoded using random linear network coding between each other and the method 900 ends. If the data loss rate is not less than the second threshold, the method 900 ends.

Figure 10:
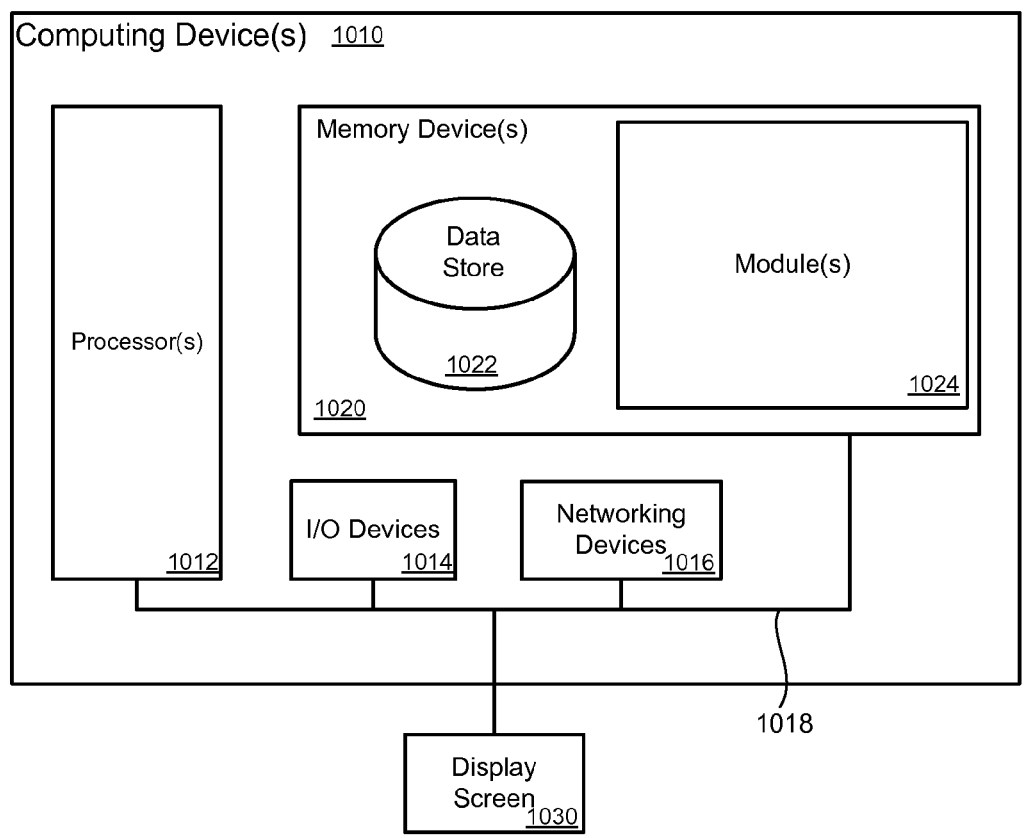
FIG. 10 is block diagram illustrating an example of a computing device for using a tunneling interface and RLNC (random linear network coding) encoding.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules that are executable by the processor(s) 1012 and data for the modules. Located in the memory device 1020 are modules executable by the processor. For example, a module 1024 may provide a portion of the functions of the technology along with other modules located in the memory device 1020. The modules may execute the functions described earlier. A data store 1022 may also be located in the memory device 1020 for storing data related to the modules and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen 1030 that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for improving network throughput, comprising:
    identifying data located in memory of a processing device;
    sending data packets for each of a plurality of applications, located in the memory through a tunneling interface identified from a plurality of tunneling interfaces provided for each of the plurality of applications, to encapsulate the data packets using a tunneling protocol on a first computing device, wherein the data packets for each application of the plurality of applications are configured to access a separate tunneling interface provided for each application;
    encoding the data packets after the data packets are encapsulated with the tunneling protocol received via the tunneling interface using random linear network coding (RLNC) to form encoded packets, using a processor on the first computing device;
    sending the encoded packets of each of the plurality of applications via the separate tunneling interface for each application across a packet network to a second computing device;
    identifying a plurality of tokens available for each separate tunneling interface;
    determining, a number of tokens of the plurality of tokens, to be used for sending the encoded packets at a selected speed, wherein the selected speed is a value based on the number of tokens; and
    sending the encoded packets at the selected speed.

2. The method as in claim 1, wherein the tunneling interface is a virtual private network (VPN), TAP (network tap) interface, or a TUN (network TUNnel) interface.

3. The method as in claim 1, further comprising decoding the encoded data packets at the second computing device.

4. The method as in claim 1, further comprising applying encryption to the packets sent through the tunneling interface before the data packets are RLNC encoded and sent across the network.

5. The method as in claim 1, further comprising encapsulating encoded data packets as UDP (user datagram protocol) packets in order to send them across the packet network.

6. The method as in claim 1, further comprising using a split proxy at the first computing device and second computing device to overcome TCP (transmission control protocol) slow start protocol.

7. A method as in claim 1, further comprising:
    determining a data loss rate pertaining to a datastream between the first computing device and the second computing device, wherein the datastream comprises the data packets sent and received between the first computing device and the second computing devices; and
    causing the first computing device and the second computing device to send to and receive between each other data packets encoded using random linear network coding in response to determining that the data loss rate is higher than or equal to a first threshold.

8. The method of claim 7, further causing a client and a server to stop sending and receiving data packets between each other using encoded using random linear network coding in response to determining that the data loss rate is lower than a second threshold.

9. The method of claim 8, wherein the first threshold is greater than the second threshold.

10. A system for improving network throughput, the system comprising:
    a first application in a memory device of a client configured to send data packets over a computer network;
    a second application in a memory device of a client configured to send data packets over a computer network;
    a first tunneling interface at the client configured to receive the data packets from the first application and encapsulate the data packets using a tunneling protocol;
    a second tunneling interface at the client configured to receive the data packets from the first application and encapsulate the data packets using the tunneling protocol;
    an encoder at the client that encodes the data packets from each of the first application and the second application, after the data packets of the first application have been encapsulated using the tunneling protocol from the first tunneling interface, and the data packets of the second application have been encapsulated using the tunneling protocol from the second interface, using random linear network encoding to form encoded data packets; and
    a TCP (transmission control protocol) layer configured to encapsulate and send the encoded data packets of the first application via the first tunneling interface and the second application via the second tunneling interface over the internet using UDP (user datagram protocol), wherein the TCP layer is further configured to: identify a plurality of tokens available for each of the first application and the second application; determine a number of tokens for the first application from the plurality of tokens available for the first application and determine a number of tokens for the second application from the plurality of tokens available for the second application to be used for sending the encoded data packets at a selected speed, wherein the selected speed is a value based on the number of tokens for the first application and the number of tokens for the second application; and sending the encoded data packets at the selected speed.

11. The system as in claim 10, further comprising receiving the encoded data packets and decoding the random linear network encoding and encapsulation at a client to access network messages from the client device.

12. The system as in claim 10, further comprising:
a data traffic measurement module that determines a data loss rate pertaining to a datastream between a first computing device and a second computing device, wherein the datastream comprises the data packets sent and received between the first computing device and the second computing device; and
a control module that causes the first computing device and the second computing device to send and receive data packets between each other encoded using random linear network coding in response to the data traffic measurement module determining that the data loss rate is higher than or equal to a first threshold,
wherein at least a portion of the data traffic measurement module and the control module comprise one or more of hardware and executable code, the executable code stored on one or more computer readable storage media.

13. The system of claim 10, wherein the control module further causes the first computing device and the second computing device to stop sending and receiving data packets encoded using random linear network coding between each other in response to the data traffic measurement module determining that the data loss rate is lower than a second threshold.

14. The system as in claim 10, further comprising TCP or UDP configured to send the data packets using the tunneling protocol to the second application and mathematically reconstructing the data packets at the second application.

15. A method for improving network throughput, comprising:
receiving a request for data at a destination split proxy, wherein the request is encoded using random linear network coding (RLNC) and is received from a source split proxy;
encoding the request for data at the destination split proxy in a TCP packet, wherein the TCP packet is contained within a UDP packet that is encapsulated in a UDP wrapper;
decoding the request for data using random linear network coding (RLNC) at a destination split proxy, wherein the request for data is decapsulated from the UDP packet;
identifying a lost packet in the request for data;
requesting a control packet using additional mathematical RLNC coefficients from the source split proxy to rebuild the lost packet;
requesting the data located in memory of a content server;
encoding data packets received from the content server in response to the request for data using random linear network coding (RLNC) to form encoded packets;
sending the encoded packets across a packet network to the source split proxy;
identifying a plurality of tokens available at the source split proxy;
determining, a number of tokens of the plurality of tokens, to be used for sending the UDP packet at a selected speed, wherein the selected speed is a value based on the number of tokens; and,
sending the UDP packet to the destination split proxy at the selected speed.

16. The method as in claim 15, further comprising decoding the encoded packets with the data at the source split proxy using random linear network coding (RLNC) to form decoded packets.

17. The method as in claim 16, further comprising sending the decoded packets to a client.

18. The method as in claim 16, further comprising sending the request for data from a client to the source split proxy.

19. The method as in claim 15, communicating between the source split proxy and the destination split proxy using UDP (user datagram protocol) packets containing the packets that are RLNC encoded.

* * * * *